(12) United States Patent
Gourdoupi et al.

(10) Patent No.: US 7,754,843 B2
(45) Date of Patent: Jul. 13, 2010

(54) PROTON CONDUCTING AROMATIC POLYETHER TYPE COPOLYMERS BEARING MAIN AND SIDE CHAIN PYRIDINE GROUPS FOR USE IN PROTON EXCHANGE MEMBRANE FUEL CELLS

(75) Inventors: Nora Gourdoupi, Patras (GR); Maria Geormezi, Patras (GR)

(73) Assignee: Advent Technologies (GR)

( * ) Notice: Subject to any disclaimer, the term of this patent is extended or adjusted under 35 U.S.C. 154(b) by 263 days.

(21) Appl. No.: 12/080,933

(22) Filed: Apr. 7, 2008

(65) Prior Publication Data

US 2008/0248364 A1 Oct. 9, 2008

Related U.S. Application Data

(60) Provisional application No. 60/922,111, filed on Apr. 5, 2007.

(51) Int. Cl.
*C08G 61/02* (2006.01)
(52) U.S. Cl. .......................... 528/86; 528/168; 528/172; 528/211; 525/390; 427/385.5; 429/12
(58) Field of Classification Search .................. 528/86, 528/211, 172, 168; 525/390; 427/385.5; 429/12
See application file for complete search history.

(56) References Cited

FOREIGN PATENT DOCUMENTS

EP 0 255 778 A 2/1988

OTHER PUBLICATIONS

Yasuda et al. Macromolecules, 2003, 36 (20).*
Daletou M K et al: "Proton conducting membranes based on blends of PBI with aromatic polyethers containing pyridine units", Journal of Membrane Science, vol. 252, No. 1-2, Jan. 1, 2003, pp. 115-122, XP009103762.
Gourdoupi et al: "Novel Proton-Conducting Polyelectrolyte Composed of an Aromatic Pyridine Units for Fuel Cell Applications", Chemistry of Materials, American Chemical Society, vol. 15, No. 26, Jan. 1, 2003, pp. 5044-5050, XP009103778.
International Search Report for Related International Application PCT/IB2008/001544, 2009.
Written Opinion for Related International Application PCT/IB2008/001544, 2009.

* cited by examiner

*Primary Examiner*—Randy Gulakowski
*Assistant Examiner*—Shane Fang
(74) *Attorney, Agent, or Firm*—Edwards Angell Palmer & Dodge LLP; Peter F. Corless; Lisa Swiszcz Hazzard

(57) ABSTRACT

New aromatic polyether type copolymers bearing main chain pyridine and side chain pyridine or pyrimidine units, which exhibit good mechanical properties, high thermal and oxidative stability, high doping ability and high conductivity values. The polymers are useful in the preparation and application of MEA on PEMFC type single cells. The polymers are, further, particularly suitable for use in high temperature PEM fuel cells.

19 Claims, 5 Drawing Sheets

PROTON CONDUCTING AROMATIC POLYETHER TYPE COPOLYMERS BEARING MAIN AND SIDE CHAIN PYRIDINE GROUPS FOR USE IN PROTON EXCHANGE MEMBRANE FUEL CELLS

The present application claims the benefit of U.S. provisional application No. 60/922,111 filed on Apr. 5, 2007, incorporated herein by reference in its entirety.

FIELD OF THE INVENTION

This invention is related to the development of new polymeric materials that possess high glass transition temperature and high thermal and oxidative stability. In particular, the polymeric materials are provided with main and side chain polar pyridine units. Further provided are polymer electrolyte membranes and membrane electrode assemblies formed using the new polymeric materials. The new polymeric materials are suitable for use in forming high temperature proton exchange membrane fuel cells.

BACKGROUND INFORMATION

Proton exchange membrane fuel cells (PEMFC) are electrochemical energy converters, which directly transform chemical energy into electricity. They are an alternative to power generators, due to numerous benefits such as lower emissions, high efficiencies, and lower maintenance requirements (Nature 414, 2001, 332). In typical PEMFC design, a proton-conducting polymer membrane (also referred to as electrolyte membrane and polymer electrolyte membrane) is disposed between two electrodes, namely a cathode electrode and an anode electrode.

The proton exchange membrane is a vital part in the design of improved polymer electrolyte membrane fuel cells. It has three main functions: as an electrolyte medium for ion conduction and electrode reactions, as a barrier for separating reactant gases, and as a support for electrode catalysts. The membrane must not only be a good conductor for hydrogen ions, but also an electronic insulator; it must have low permeabilities to the reactant fuel and oxidant (hydrogen or methanol and oxygen); it must show mechanical strength; and it must be chemically and thermally stable under the cell operation conditions (Chem. Rev. 104, 2004, 4587).

A variety of proton exchange membranes have been developed over the years. However, to date, these membranes do not possess the combination of properties required for operation at elevated temperatures.

Technologies based on perfluorinated polymers with sulfonic acid groups in side chains, such as Nafion® PFSA polymers (Chem. Rev. 104, 2004, 4535), demonstrate excellent chemical stability. However, such membranes are not suitable at high temperatures or under low relative humidity conditions. Moreover, these membranes exhibit methanol crossover, which results in poor efficiency and limited performance levels. These membranes are costly.

Sulfonated polymer materials have been developed as alternatives to PFSA (J. Membr. Sci. 185, 2001, 3, Annu. Rev. Mater. Res. 33, 2003, 503, Chem. Mater. 15, 2003, 4896). The most widely investigated systems include sulfonation of polysulfones (J. Polym. Sci., Part A, 34, 1996, 2421, J. Membr. Sci., 139, 1998, 211, J. Appl. Polym. Sci. 77, 2000, 1250), polyetheretherketones (J. New Mater. Electrochem. Syst., 3, 2000, 93, Macromolecules, 25, 1992, 6495, Solid State Ionics, 106, 1998, 219), polyetherketoneketones (Solid State Ionics 125, 1999, 213), polyimides (J. Power Sources, 160, 1999, 127, Macromolecules, 35, 2002, 6707, J. New Mater. Electrochem. Syst., 4, 2001, 115), rigid rod poly(p-phenylene) (Macromolecules, 27, 1994, 1975, Macromol. Rapid Commun., 15, 1994, 669) polyphenyleneoxides (J. Appl. Polm. Sci., 36, 1998, 1197), polythiophenylenes (Macromolecules, 30, 1997, 2941), and polyphenylquinoxalines (J. Polym. Sci., 36, 1998, 1197).

However, PFSA and sulfonated aromatic polymer materials limit the cell operation below 90° C. At such temperatures, the presence of impurities such as carbon monoxide in the hydrogen feed will have a poisonous effect on the electrocatalyst. Electrocatalysts have also been developed for a typical operational temperature of 80° C., but 50-100 ppm of carbon monoxide can deactivate these catalysts. The need for humidified gases as well as the demand high purity hydrogen result in increased operation costs.

Recently polybenzimidazole (PBI) materials have been proposed for use in proton exchange membranes. U.S. Pat. No. 5,091,087, for example, relates to a process for preparing a microporous PBI membrane. Phosphoric acid-doped polybenzimidazole (PBI), in particular, has emerged as a promising candidate for a low cost and high performance fuel cell membrane material. Apart from high thermal stability and good membrane-forming properties, PBI contains basic functional groups which have been shown to easily interact with strong acids (Solid State Ionics, 118, 1999, 287, Electrochim. Acta 45, 2000, 1395, J. Electrochem. Soc., 151(1), 2004, A8) such as $H_3PO_4$ and $H_2SO_4$, thereby allowing proton migration along the anionic chains. PBI membranes further provide high glass transition temperature (above 400° C.) and the ability of impregnated acid to act as a proton solvating species, thereby making them proton conductive. PBI membranes also show high proton conductivity at high temperature (>100° C.) under low relative humidity conditions, and have a high CO tolerance. PBI has also been shown to become a proton conductor at temperatures up to 200° C. when sulfonated (U.S. Pat. No. 4,814,399), phosphonated (U.S. Pat. No. 5,599,639), or doped with a strong acid (U.S. Pat. No. 5,525,436 and J. Electrochem. Soc. 142, 1995, L21). Such polymer membranes can be used as an electrolyte for PEM fuel cells with various types of fuels such as hydrogen (Electrochim. Acta, 41, 1996, 193), methanol (J. Appl. Electrochem. 26, 1996, 751), trimethoxymethane (Electrochim. Acta, 43, 1998, 3821) and formic acid (J. Electrochem. Soc. 143, 1996, L158). PBI also exhibits high electrical conductivity (J. Electrochem. Soc. 142, 1995, L21), low methanol crossover rate (J. Electrochem. Soc. 143, 1996, 1225), nearly zero water drug coefficient (J. Electrochem. Soc. 143, 1996, 1260), and enhanced activity for oxygen reduction (J. Electrchem. Soc. 144, 1997, 2973). However, the availability of PBI is limited. Further, PBI presents only moderate mechanical properties and has low oxidative stability.

Another recent approach is the use of ionically cross-linked acid-base blends that posses high conductivity, thermal stability, and mechanical flexibility and strength. Combination of acidic polymers (sulfonated polysulfone, sulfonated polyethersulfone or sulfonated polyetheretherketone) and basic polymers (polybenzimidazole (PBI), polyethyleneimine and poly(4-vinylpyridine)) have been explored (Solid State Ionics 125, 1999, 243, J. New Mater. Electrochem. Syst. 3, 2000, 229). Sulfonated polysulfone/PBI membranes doped with phosphoric acid have also been investigated exhibiting chemical and thermal stability and good proton conductivity (Macromolecules 33, 2000, 7609, Electrochim. Acta 46, 2001, 2401, J. Electrochem. Soc. 148, 2001, A513). Blends of PBI with aromatic polyether copolymer containing pyridine units in the main chain have also been prepared, resulting in easily doped membranes with good mechanical properties and oxidative stability (Journal of the Membrane Science 2003, 252, 115).

Polymeric materials have recently been under development which aim to fulfill the prerequisites for use in high temperature PEMFCs. Poly(2,5-benzimidazole) (ABPBI) is the simplest polybenzimidazole type polymer (Fuel Cells 5, No3, 2005, 336, Electrochem. Commun. 5, 2003, 967, J. Membr. Sci. 241 2004, 89, Macromol. Rapid Commun. 25, 2004, 894) with thermal stability and conducting properties as good as those of PBI, and with comparable performance in high temperatures PEM fuel cells. High-temperature aromatic polyether type copolymers (Macromol. Rapid Commun. 26, 2005, 1724, J. Membr. Sci. 252, 2005, 115, J. Membr. Sci. 197, 2002, 231, J. Polym. Sci.: Part A: Polym. Chem., 41, 2003, 2264) containing basic groups like PBI have been shown to enable formation of complexes with stable acids and to exhibit high thermal and chemical stability, and good conducting properties which are useful in high temperature PEMFCs. However, such materials still do not possess the combination of properties required for use in high temperature fuel cells.

Some recent technologies are directed to the direct catalyzation of membranes, in particular aqueous based polymer electrolytes such as perfluorinated sulfonic acids. These approaches, however, are limited by the ability to translate developments to mass manufacturability while maintaining reproducibility (batch vs. continuous) and while keeping costs reasonable. Depending on the deposition methods used, these approaches can be classified into the following broad categories, (i) thin film formation with carbon supported electrocatalysts, (ii) pulse electrodeposition of noble metals (Pt and Pt alloys), (iii) sputter deposition, (iv) pulse laser deposition, and (v) ion-beam deposition. While all of these approaches aim to improve the charge transfer efficiency at the interface, some of the approaches provide for a better interfacial contact which allows for efficient movement of ions, electrons, and dissolved reactants in the reaction zone, while other approaches additionally effect modification of the electrocatalyst surface (such as those rendered via sputtering, electrodeposition or other deposition methods).

Several variations of first approach, which uses thin film technology in conjunction with conventional carbon supported electrocatalysts, have been reported. One such approach is the so called "decal" approach, wherein the electrocatalyst layer is cast on a PTFE blank and then decaled on to the membrane (J. App. Electrochem. 22, 1992, 1; J. Power Sources 71, 1998, 174). Alternatively an "ink" comprising of Nafion® solution, water, glycerol and electrocatalyst is coated directly on to the membrane (in the Na$^+$ form) (J. Electrochem. Soc. 139(2), 1992, L28). These catalyst coated membranes are subsequently dried, typically under vacuum, 160° C., and ion exchanged to the H$^+$ form (J. App. Electrochem. 22, 1992, 1). Modifications to this approach have been reported with variations in choice of solvents and heat treatment (J. Power Sources 113(1), 2003, 37; Electrochemica Acta 50(16-17), 2005, 3200) as well as choice of carbon supports with different microstructure (J. Electrochem. Soc. 145(11), 1998, 3708). Other variations to the "thin film" approach have also been reported such as those using variations in ionomer blends (WO Pat., (E.I. Dupont de Nemours and Company, USA). 2005, 24 pp.), ink formulations (GS News Technical Report 63(1), 2004, 23), spraying techniques (Proc.-Electrochem. Soc. 94-23 (Electrode Materials and Processes for Energy Conversion and Storage), 1994, 179; IN Pat., (India). 1998, 13 pp), pore forming agents (Dianhuaxue 6(3), 2000, 317), and various ion exchange processes (GS News Technical Report 62(1), 2003, 21). At its core, this approach relies on extending the reaction zone further into the electrode structure away from the membrane, thereby providing for a more three dimensional zone for charge transfer. Most of the variations reported above enable improved transport of ions, electrons, and dissolved reactant and products in the "reaction layer" motivated by need to improve electrocatalyst utilization. These attempts, in conjunction with use of Pt alloy electrocatalysts, have formed the bulk of the current state of the art in the PEM fuel cell technology. The limitations of this approach include problems with controlling the Pt particle size (with loading on carbon in excess of 40%), problems with uniformity of deposition in large scale production, and cost (due to several complex processes and/or steps involved).

An alternative method for enabling higher electrocatalyst utilization has been attempted with pulse electrodeposition. For example, Taylor et al. (J. Electrochem. Soc. 139(5), 1992, L45) is one of the first to report this approach. In accordance with Taylor's process, pulse electrodeposition with Pt salt solutions, which relied on their diffusion through thin Nafion® films on a carbon support, provides electrodeposition in regions of ionic and electronic contact on the electrode surface. A recent review on this method by Taylor et al., describes various approaches to pulse electrodeposition of catalytic metals (U.S. Pat. No. 6,080,504). In principal, this methodology is similar to the thin film approach described above, albeit with a more efficient electrocatalyst utilization, since the deposition of electrocatalysts theoretically happens at the most efficient contact zones for ionic and electronic pathways. Improvements to this approach have been reported by Antoine and Durand (Electrochem. and Solid-State Lett. 4(5), 2001, A55) and by Popov et al., (Plating and Surface Finishing 91(10), 2004, 40). Developments in the pulse algorithms and cell design have enabled narrow particle size range (2-4 nm) with high efficiency factors and mass activities for oxygen reduction. Though these methods provide additional benefits, there are concerns on the scalability of such methods for mass scale manufacturing.

Sputter deposition of metals on carbon gas diffusion media is another alternative approach. However, the interfacial reaction zone is more in the front surface of the electrode at the interface with the membrane. The original approach involved applying a layer of sputter deposit on top of a regular Pt/C containing conventional gas diffusion electrode. Such an approach exhibited a boost in performance by moving part of the interfacial reaction zone in the immediate vicinity of the membrane (Electrochemica. Acta 38(12), 1993, 1661). Recently, Hirano et al. (Electrochim. Acta 42(10), 1997, 1587) reported using a thin layer of sputter deposited Pt on wet proofed non-catalyzed gas diffusion electrode (equivalent to 0.01 mgpt/cm$^2$) with similar results as compared to a conventional Pt/C (0.4 mgpt/cm$^2$) electrode obtained commercially. Cha and Lee (J. Electrochem. Soc. 146, 1999, 4055), report an approach with multiple sputtered layers (5 nm layers) of Pt interspersed with Nafion®-carbon-isopropanol ink, (total loading equivalent of 0.043 mgpt/cm$^2$) which exhibited equivalent performance to conventional commercial electrodes with 0.4 mgpt/cm$^2$. Huag et al. (J. Electrochem. Soc. 149, 2002, A862) studied the effect of the substrate on the sputtered electrodes. Further, O'Hare et al., studied the sputter layer thickness, and reported that best results were obtainable with a 10 nm thick layer. Further, advancements have been made with sputter deposition as applied to direct methanol fuel cells (DMFC) by Witham et al. (Electrochem. and Solid-State Lett. 3(11), 2000, 497; Proc.-Electrochem. Soc. 2001-4 (Direct Methanol Fuel Cells):

2001, 114), wherein several fold enhancements in DMFC performance were reported compared to electrodes containing unsupported PtRu catalyst. Catalyst utilization of 2300 mW/mg at a current density of 260 to 380 mA/cm² was reported (Electrochem. and Solid-State Lett. 3(11), 2000, 497; Proc.-Electrochem. Soc. 2001-4 (Direct Methanol Fuel Cells): 2001, 114). While the sputtering technique provides for a cheaper direct deposition method, the principal drawback is durability. In most cases, the deposition has relatively poor adherence to the substrate, and under variable conditions of load and temperature, there is a greater probability of dissolution and sintering of the deposits.

An alternative method dealing direct deposition was recently reported using pulsed laser deposition (Electrochem. and Solid-State Lett. 6(7), 2003, A125). Excellent performance was reported with loadings of 0.017 mgpt/cm² in a PEMFC. However this was only applicable with the anode electrodes, and no cathode application has been reported to date.

All these new direct deposition methodologies provide questionable mass manufacturability with adequate control on reproducibility. 3 M company has proposed approaches for mass manufacture of electrodes with low noble metal loading (U.S. Pat. No. 5,879,828). In accordance with these approaches, a series of vacuum deposition steps are used with appropriate selection of solvents and carbon blacks, which results in nanostructured noble metal containing carbon fibrils which are embedded into the ionomer-membrane interface (U.S. Pat. No. 5,910,378 and U.S. Pat. No. 5,879,827).

Another alternative technique involves the use of ion-beam techniques, wherein low energy ion bombardment concurrent to thin film vacuum deposition (electron beam) is used to provide dense, adhering, and robust depositions. Mechanisms of ion/solid interactions during thin film growth as well as development of various protocols for specific application areas (including tribology, anti corrosion coatings, superconducting buffer layers and coatings on temperature sensitive substrates such as polymers) have been studied (Mat Res. Soc. Symposium Proceedings 792(Radiation Effects and Ion-Beam Processing of Materials): 2004, 647). Modifications of this approach to prepare 3-D structures including overhang and hollow structures have also been recently reported (J. Vac. Sci. Tech., B: Microelectronics and Nanometer Structures-Processing, Measurement, and Phenomena 21(6), 2003, 2732). Use of dual anode ion source for high current ion beam applications has also been reported recently (Rev. Sci. Inst. 75(5, Pt. 2), 2004, 1934), where benefits for mass production environment are discussed.

SUMMARY OF THE INVENTION

New polymeric materials are now provided which include a main chain pyridine unit and one or more side chain pyridine or pyrimidine units. These materials exhibit good mechanical properties, high thermal and oxidative stability, high doping ability and high conductivity values. The materials are particularly suitable for use as electrolytes in high temperature PEM fuel cells. In particular, the methods and materials of the invention provide alternative low cost polymeric systems that combine all the desired properties for application in fuel cells operating at temperatures above 120° C.

By providing proton exchange membrane fuel cells (PEM-FCs) that are operational at temperatures higher than 120° C., the following benefits can be achieved: (1) the kinetics for both electrode reactions are enhanced; (2) above the boiling point of water, operation of PEMFCs involves only a single phase of water, i.e, the water vapor, and therefore can be simplified; (3) the required cooling system will be simple and practically possible due to the increased temperature gradient between the fuel cell stack and the coolant; (4) the heat can be recovered as, e.g., steam, which in turn can be used either for direct heating or steam reforming or the pressurized operation, and in this way the overall system efficiency is significantly increased; (5) the CO tolerance is dramatically enhanced, (e.g. from 10-20 ppm of CO at 80° C., to 1000 ppm at 130° C., and up to 30000 ppm at 200° C.; see J. Electrochem. Soc. 150, 2003, A1599). This high CO tolerance makes it possible for the present fuel cells to use hydrogen directly from a simple reformer, so that the water-gas-shift reactor, the selective oxidizer, and/or the membrane separator for the CO cleanup can be eliminated from the fuel processing system; (6) the operational temperature of a fuel cell around 200° C. is close to temperatures for methanol reforming and for hydrogen desorption of the newly developed high-capacity storage materials. This will allow for an integration of the fuel cell with a methanol reformer or high-capacity hydrogen storage tank. The integration is expected to give the overall power system advanced features including higher efficiency, smaller size, lighter weight, simple construction and operation and efficient capital and operational cost.

The present membranes further exhibit high acid uptake, which results in high ionic conductivities in the range of $10^{-2}$ S/cm.

In one aspect, the invention generally relates to aromatic polyether copolymer materials having the Formula I:

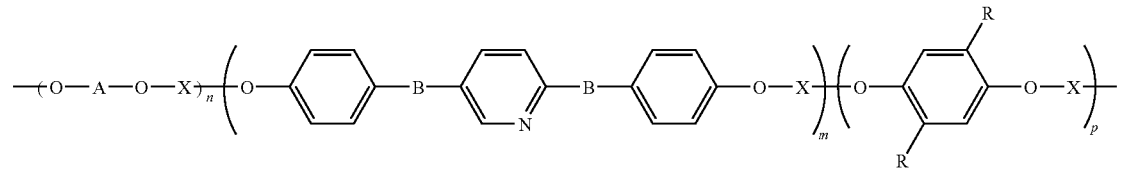

Formula I wherein A is selected from the group consisting of:

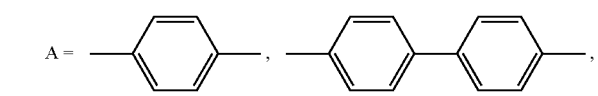

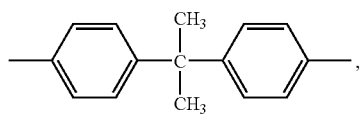

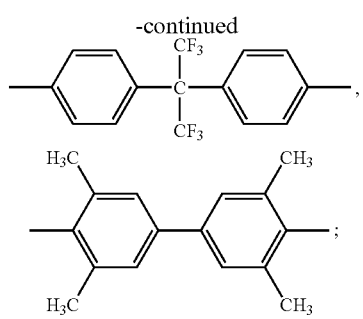

B is selected from the group consisting of:

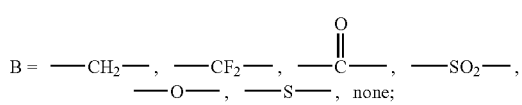

R is selected from the group consisting of:

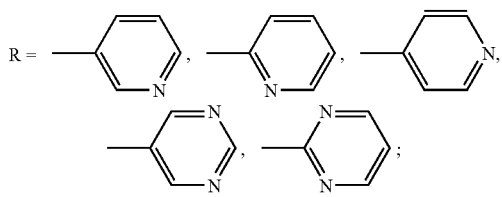

X is identical or different and is selected from the group consisting of:

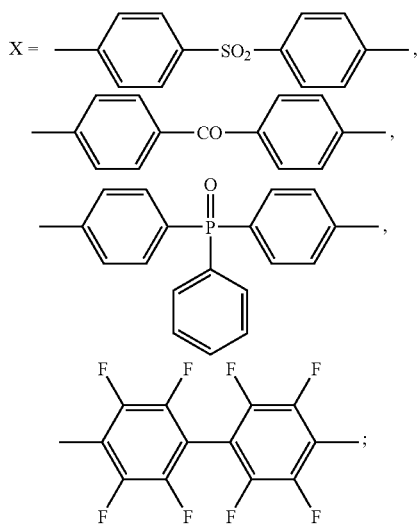

or a salt thereof; and n ranges from about 1% to about 98%, m ranges from about 1% to about 98%, and p ranges from about 1% to about 98%, and n+m+p=100%.

Embodiments according to this aspect of the invention can include the following features. The copolymer can be a block, random, periodic and/or alternating polymer. The copolymer can be doped with one or more acids. The one or more acids can be selected from sulfuric acid, phosphoric acid, hydrochloric acid, nitric acid, heteropolyacids, antimonic acid, phosphoantimonic acid, and combinations thereof. The copolymer can be mixed with organic base heterocycles selected from imidazol, pyrazole, methyl-imidazole, and imidazole derivatives. The copolymer can comprise the reaction product of an aromatic difluoride with main chain pyridine and side chain pyridine or pyrimidine units. The aromatic difluoride can be bis-(4-fluorophenyl)sulfone, bis-(4-fluorophenyl)phenylphosphine oxide, 4,4'-difluorobenzophenone, or decafluorobipheynyl.

In another aspect, the invention generally relates to copolymer blends comprising two or more different copolymers set forth herein mixed with dimethylacetamide solutions at predetermined ratios.

Embodiments according to this aspect of the invention can include the following features. The blend can comprise two different copolymers mixed at a predetermined ratio of about 50/50. The blend can be further doped with one or more acids. The one or more acid can be selected from sulfuric acid, phosphoric acid, hydrochloric acid, nitric acid, heteropolyacids, antimonic acid, phosphoantimonic acid, and combinations thereof. The blend can be further mixed with organic base heterocycles selected from imidazol, pyrazole, methyl-imidazole, and imidazole derivatives.

In another aspect, the invention generally relates to a composition comprising a slurry mixture of one or more copolymers set forth herein and a polar aprotic solvent. In another aspect, the invention generally relates to a composition comprising a slurry mixture of the blends set forth herein and a polar aprotic solvent.

In another aspect, the invention generally relates to a process for preparing aromatic polyether copolymer materials having Formula I, wherein the process comprises polycondensing monomers at high temperature.

In another aspect, the invention generally relates to a process for preparing aromatic polyether copolymer materials having Formula I, wherein the process comprises reacting an aromatic difluoride with main chain pyridine and side chain pyridine or pyrimidine units.

Embodiments according to this aspect of the invention can include the following features. The aromatic difluoride can be selected from bis-(4-fluorophenyl)sulfone, bis-(4-fluorophenyl)phenylphosphine oxide, 4,4'-difluorobenzophenone, or decafluorobiphenyl.

In another aspect, the invention generally relates to a method of preparing a catalyst comprising providing a hydrophobic layer; depositing onto the hydrophobic layer a layer of a composition comprising a slurry mixture of the copolymer of Formula I and a polar aprotic solvent, wherein the layer is deposited by calendaring, screen printing, or spraying; and drying and sintering the deposited layer.

In another aspect, the invention generally relates to a layered membrane electrode assembly, comprising a substrate layer, a gas diffusion layer, and a reaction layer comprising one or more copolymers of Formula I.

Other aspects of the invention are disclosed infra

BRIEF DESCRIPTION OF THE DRAWINGS

For a fuller understanding of the nature and desired objects of the present invention, reference is made to the following detailed description taken in conjunction with the accompanying drawing figures.

DEFINITIONS

Figure 1:
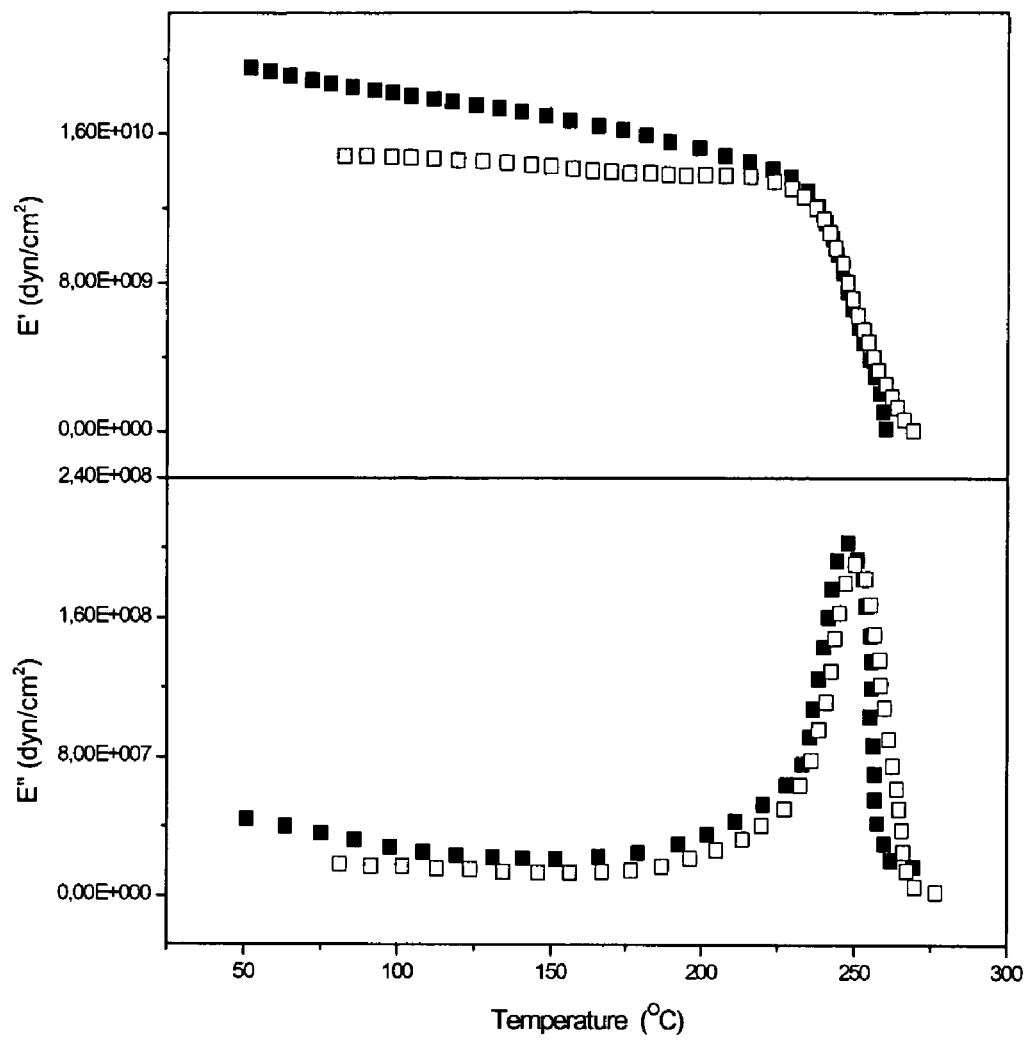
FIG. 1 shows the temperature dependence of the storage (E') and loss (E") modulus of copolymer 1 before (■) and after (□) the treatment with $H_2O_2$.

The following definitions are for convenient reference with respect to the following description and are not to be construed in a limiting manner.

The term Gel Permeation Chromatography ("GPC") shall be understood to mean or refer to a method or technique used in order to determine the molecular weight (Mn and Mw) and dispersity of the polymers.

The term Nuclear Magnetic Resonance ("NMR") shall be understood to mean or refer to a method or technique used in order to identify the chemical and molecular structure of the polymers and the proportion of the monomers in the copolymers.

The term Dynamic Mechanical Analysis ("DMA") shall be understood to mean or refer to a method or technique used in order to identify the Tg (glass transition temperature) of the polymers.

The term Thermogravimetric Analysis ("TGA") shall be understood to mean or refer to a method or technique used in order to study the thermal, and oxidative stability before and after Fenton's test.

The term Fenton's Test shall be understood to mean or refer to a method or technique used in order to study and determine the oxidative stability of the polymers.

The term Four Probe Technique shall be understood to mean or refer to a method or technique used in order to study the dependence of the ionic conductivity on high doping levels versus temperature as well as the dependence of the ionic conductivity versus doping level.

DETAILED DESCRIPTION OF THE INVENTION

The present invention relates to the development of new polymeric materials composed of a main chain pyridine unit and one or more side chain pyridine or pyrimidine units. These polymeric materials have high glass transition temperatures and high thermal and oxidative stability, and are suitable for use in forming high temperature proton exchange membrane fuel cells.

In some embodiments, the polymeric materials are aromatic polyether copolymers bearing main and side chain pyridine and pyrimidine groups, aromatic or heteroaromatic diols, and aromatic or heteroaromatic difluorides. In some embodiments, polymeric materials are provided which bear main chain pyridine units, side chain pyridine or pyrimidine units, and tetramethyl biphenyl moieties.

In an exemplary embodiment, the present copolymers are based on aromatic polyethers having the general structure as shown below in Formula I:

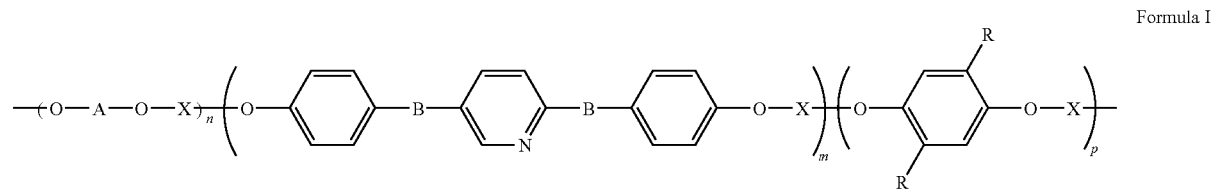

Formula I wherein n, m and p are each independently about 1% to about 98%, and n+m+p=100%;

wherein A is selected from the group consisting of:

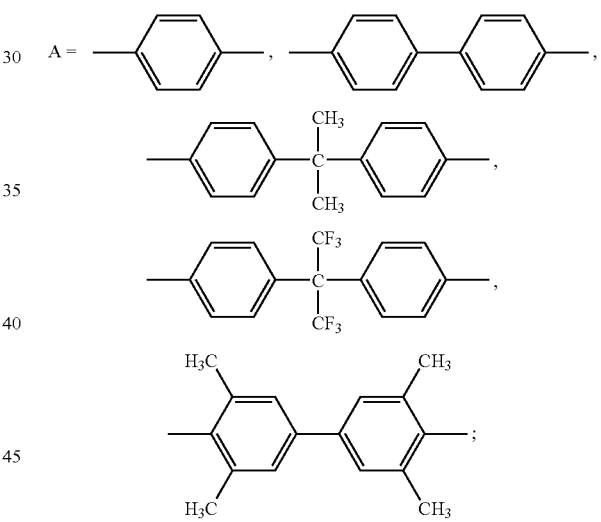

wherein B is selected from the group consisting of:

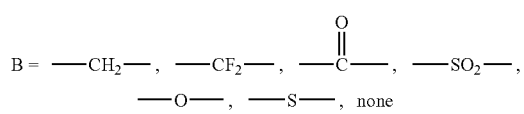

wherein R is selected from the group consisting of:

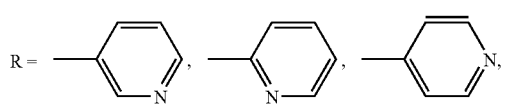

-continued

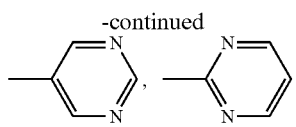

and wherein X is identical or different, and is selected from the group consisting of:

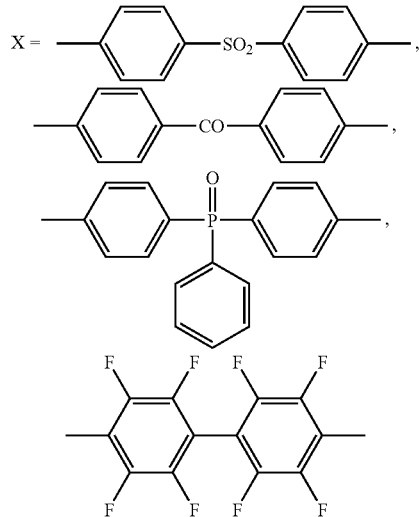

As used herein, it should be appreciated that the order of monomeric units represented in polymer formulas of the present invention does not so limit the order of monomeric units but, rather, merely indicates the presence of such monomeric units in the polymer. It is to be further understood that the variables (e.g. n, m, p) represent the total relative ratio of each monomeric unit. Thus, the total amount "n" can be dispersed throughout the polymer in the same or varying concentrations, or all/substantially all of such unit can be concentrated in a particular location of the polymer.

In one embodiment, A is

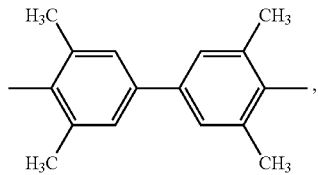

B is nothing, R is

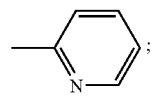

and X is identical and is

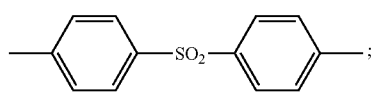

The resulting copolymer is shown below as copolymer 1:

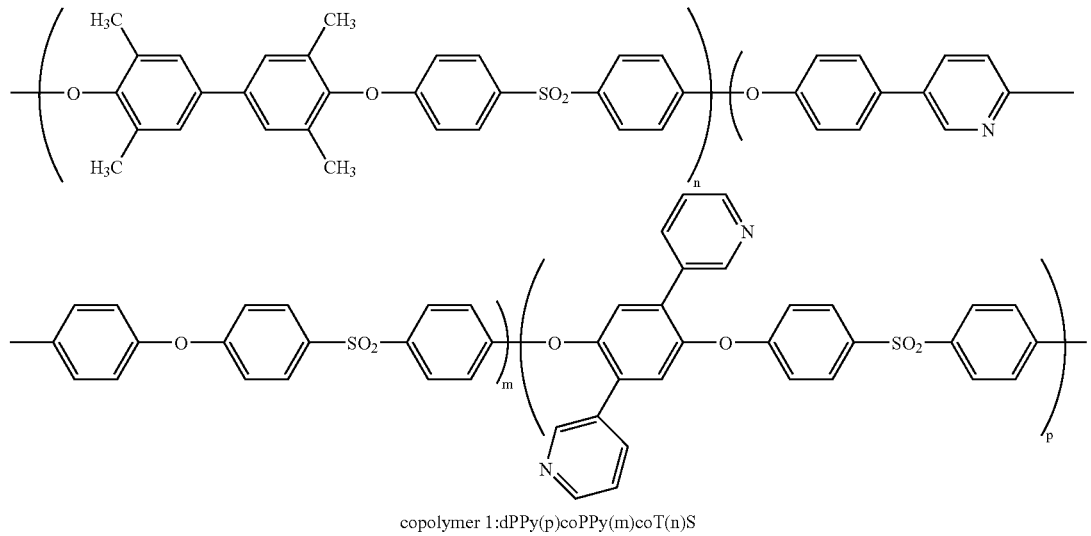

copolymer 1:dPPy(p)coPPy(m)coT(n)S wherein n, m, and p represent the content of the tetramethyl, pyridine and side chain pyridine diol in the polymer main chain, respectively. In accordance with the present invention, n, m, and p are each independently about 1% to about 98%, and n+m+p=100%.

Polymers of the invention may be suitably prepared by a variety of approaches. In one embodiment, the polymers are prepared by nucleophilic aromatic substitution. Nucleophilic aromatic substitution is a known process and, thus, the general methods for preparing the present polymeric materials can be in accordance with these general procedures (e.g., see Polymer 1984, 25, 1827, J. Polym. Sci., Part A: Polym. Chem., 2003, 41, 2264, J. Membr. Sci., 2004, 239, 119; U.S. Pat. No. 5,387,629; EP 1611182 A2; WO 02/25764 A1). For example, in one embodiment, the polymer materials are synthesized via nucleophilic aromatic substitution of aromatic difluorides with diols. Suitable diols include, but are not limited to aromatic diols, one pyridine containing diols, and two pyridine or pyrimidine containing diols. Suitable aromatic difluorides include, but are not limited to bis-(4-fluorophenyl)sulfone, decafluorobipheynyl,4,4'difluorobenzophenone, and bis(4-fluorophenyl) phenylphosphine oxide.

Figure 2:
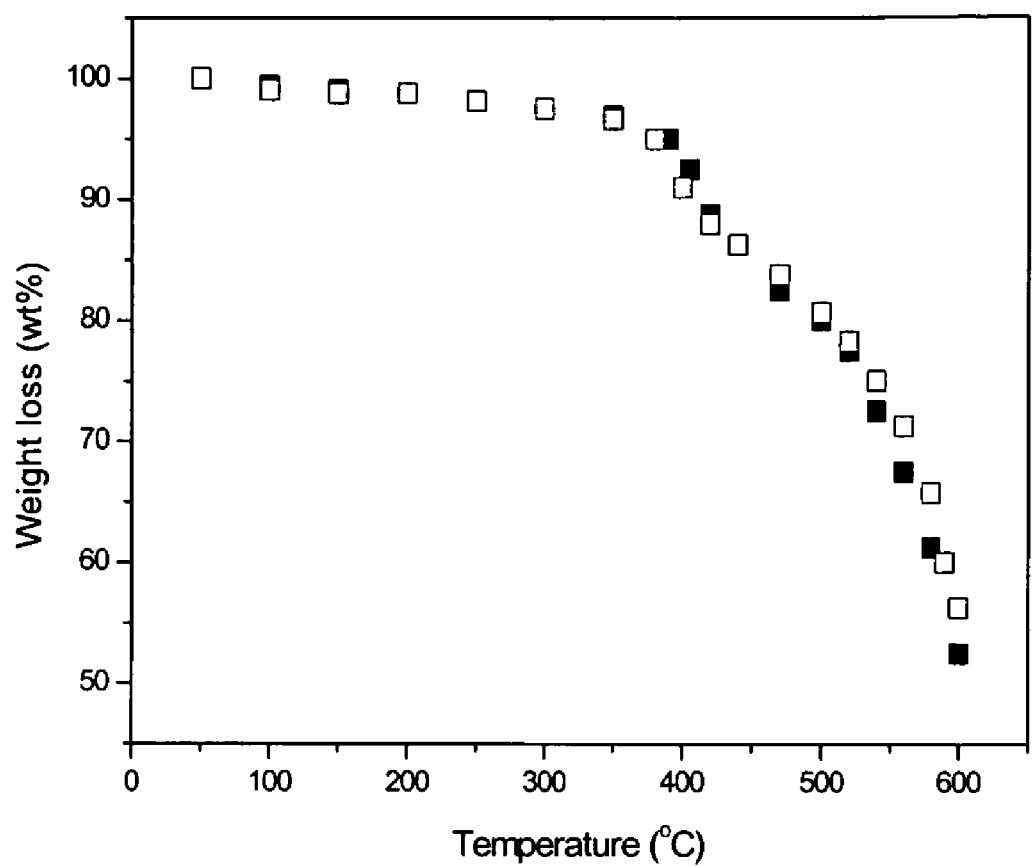
FIG. 2 shows the thermogravimetric analysis of copolymer 1 before (■) and after (□) the treatment with $H_2O_2$.
Figure 3:
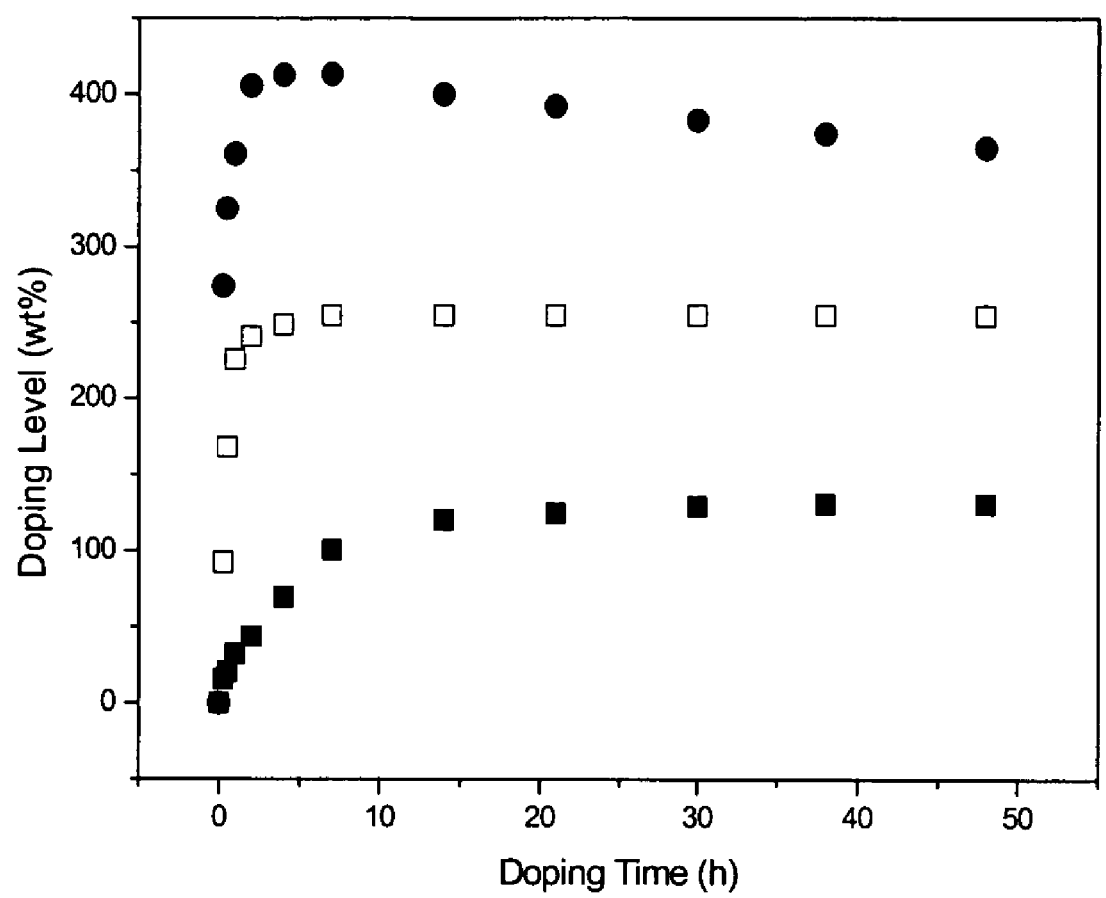
FIG. 3 shows the time dependence of doping level (wt %) of copolymer 1 at 50° C. (■), 80° C. (□) and 100° C. (●).
Figure 4:
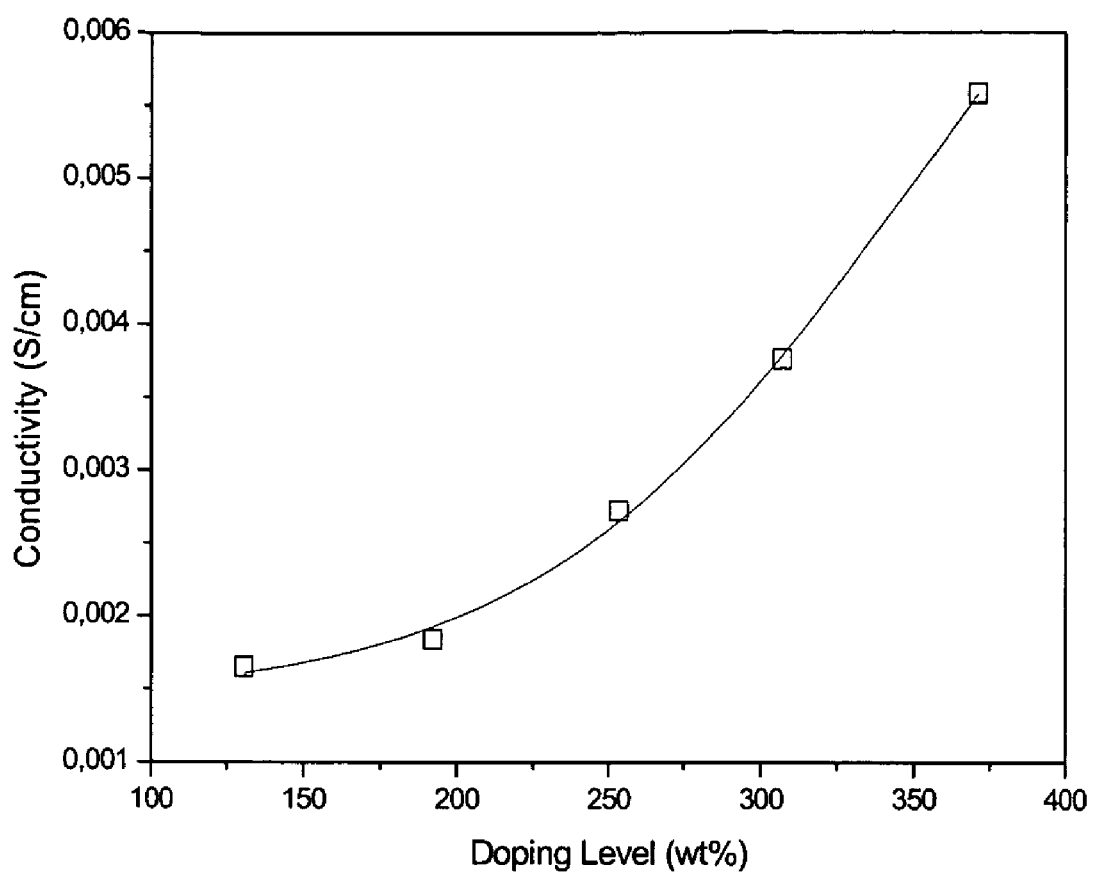
FIG. 4 shows the doping level dependence of ionic conductivity of copolymer 1 at room temperature.
Figure 5:
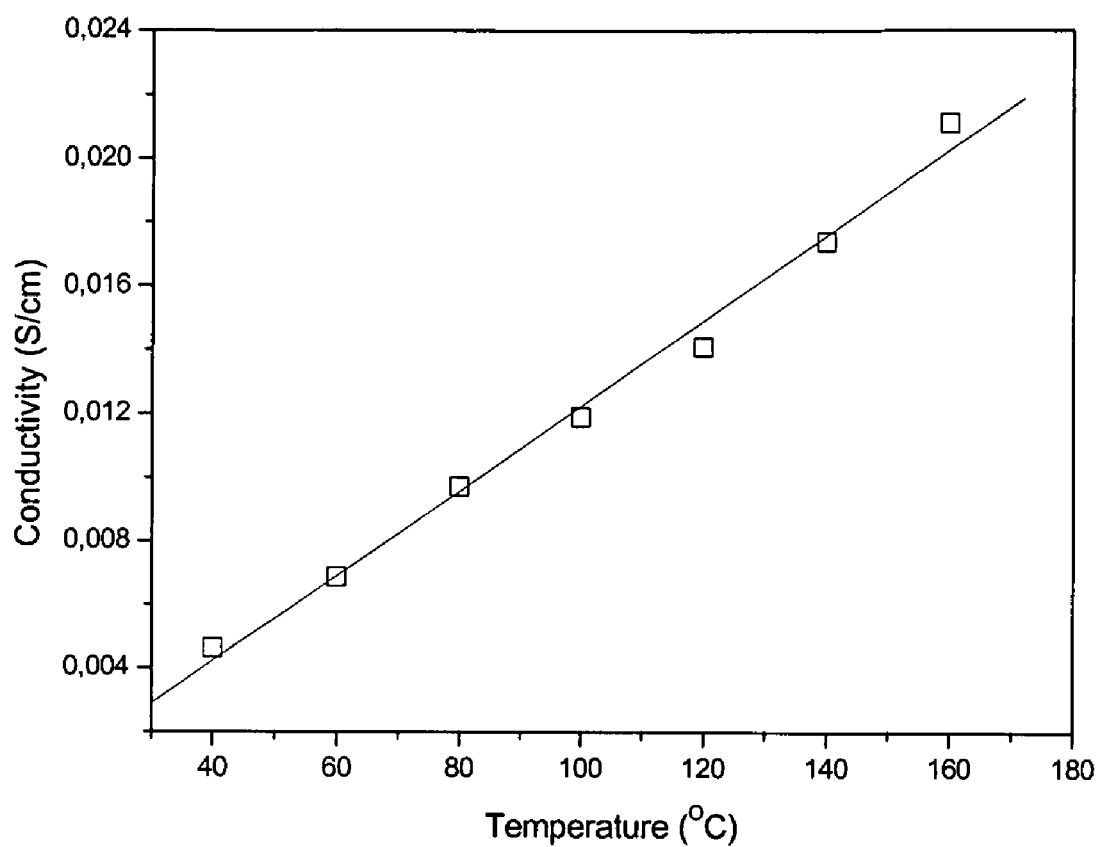
FIG. 5 shows the temperature dependence of ionic conductivity of copolymer 1 with doping level 370 wt % at 0% relative humidity.

The glass transition temperature of the present copolymers can be examined through dynamic mechanical analysis. The copolymers exhibit glass transition temperature depending on the structure, copolymer composition, and molecular weight. For example, as shown in FIG. 1, the Tg of dPPy(10) coPPy(54)coT(36)S is 248° C. The chemical, thermal, and oxidative stability of the copolymers can be tested using the Fenton's test. In particular, membrane samples can be immersed into 3 wt % $H_2O_2$ aqueous solution containing 4 ppm $FeCl_2 \times 4H_2O$ at 80° C. for 72 h. The oxidative stability of the copolymers can be examined with dynamic mechanical analysis and thermogravimetric analysis. As shown in FIG. 1, the copolymers retain their mechanical integrity and flexibility both before and after treatment with $H_2O_2$. FIG. 2 illustrates the weight of dry samples of copolymer 1 before and after experimentation. As shown, the membranes retain their high thermal stability after the Fenton's treatment. As shown in FIG. 3, in order to obtain the maximum doping level, the membranes are immersed into 85 wt % phosphoric acid solution at different temperatures and for different doping times. The wet membranes are wiped dry and quickly weighed again. The acid uptake of membranes is defined as the weight percent of the acid per gram of the copolymer. As the doping temperature increases, the phosphoric acid doping level also increases and reaches plateau values of around 370 wt % $H_3PO_4$ doping level for copolymer 1 at 100° C. These polymers are easily doped with inorganic acids, such as phosphoric acid, resulting in ionically conducting membranes. FIG. 4 illustrates the doping dependence of the conductivity of a sample of copolymer 1 doped with phosphoric acid. FIG. 5 illustrates the effect of temperature on the conductivity of copolymer 1 doped with 370 wt % phosphoric acid. As shown, the conductivity increases as temperature increases. At 160° C. the conductivity reached a value of $2.1*10^{-2}$ S/cm even at zero relative humidity.

In one embodiment, membranes of the invention are prepared by film casting of polymer solutions of the present polymeric materials. More particularly, one or more of the present polymer materials are dissolved in a suitable solvent at a suitable temperature. In one exemplary embodiment, one or more of the present polymer materials are dissolved in a polar aprotic solvent, such as N,N-dimethylacetamide, at room temperature. In embodiments using polymer material blends, corresponding polymer solutions are mixed using suitable ratios. The solvent is subsequently evaporated, for example, by pouring the solution into a glass dish and evaporating the solvent at elevated temperature (e.g. in an oven at 80-100° C. for about 24 h). The resulting membranes can be further dried to remove residual solvent, for example, under reduced pressure and elevated temperature such as at 100-130° C. under vacuum. In embodiments wherein the polymers present melting temperatures up to 300° C., melt extrusion can be used for continuous membrane preparation, if desired.

In another exemplary embodiment, membranes of the invention are prepared by dissolving one or more of the present polymers in a polar aprotic solvent such as dimethyacetamide. The resulting solutions are stirred at room temperature for 5 h and then casted on a glass dish. The solvent is evaporated in an oven at suitable temperatures and times (e.g. at about 70° C. for about 24 h). The resulting membranes are dried under suitable conditions, such as under vacuum at about 160° C. for about 72 h.

In some embodiments, polymer electrolyte membranes can be mixed suitably with organic base heterocycles such as imidazol, pyrazole, methyl-imidazole or other imidazole derivatives.

Membrane electrode assemblies are further provided which comprise the present polymer electrolyte membranes. In one embodiment, membrane electrode assemblies include a layered sandwich structure referred to herein as a membrane electrode assembly (MEA), which comprises an anode-membrane-cathode sandwich. In some embodiments, each electrode in this sandwich structure comprises separate layers. These layers can include, for example, (i) a substrate layer, (ii) a gas diffusion layer, and (iii) a reaction layer. Individual components may be commercially available such as the substrate layer, materials for gas diffusion layer, and the catalysts in the reaction layer.

The present invention further relates to a method for implementing membrane electrode assemblies (MEAs) using the present polymer electrolytes as described herein. The methods for implementing membrane electrode assemblies include, for example, (a) a gas diffusion and current collecting electrode component, (b) a reaction layer component comprising of a catalyst and ion conducting elements in conjunction with crosslinkers, and (c) Pt alloy electrocatalysts for enhanced CO tolerance and oxygen reduction reaction activity.

The Gas Diffusion Electrode Component

In accordance with one embodiment, an electrically conducting substrate is selected from a combination of woven carbon cloth (such as Toray fiber T-300) or paper (such as the Toray TGP-H-120) that has been previously wet-proofed using PTFE based solutions (DuPont, USA) or similar materials. The typical porosity of the substrate is between about 75-85%. The wet proofing can be achieved, in some embodiments, with a combination of dip coating for fixed duration (e.g. between 30 secs to 5 mins) followed with drying in flowing air. Such a wet proofed substrate can be coated with a gas diffusion layer, if desired. In certain embodiments, the gas diffusion layer comprises select carbon blacks and PTFE suspension. The choice of carbon blacks used in this layer can range from Ketjen black to turbostratic carbons such as Vulcan XC-72 (Cabot Corp, USA), with typical surface areas in the range of about 250 to 1000 $m^2$/gm. The deposition can be applied with a coating machine such as Gravure coaters from Euclid coating systems (Bay City, Mich., USA). In particular, a slurry composition comprising carbon black and PTFE in aqueous suspension (such as Dupont PTFE-30, Dupont USA) is applied to a certain thickness over the carbon paper or cloth substrate (e.g. with the aid of a coating machine). Typical thickness include those of 50-500 microns. Pore forming agents can be used to prepare the diffusion layer on the carbon conducting paper or cloth substrate. By carefully controlling the pore formers, which typically consist of various combinations of carbonates and bicarbonates (such as ammonium and sodium analogs), gas access to the reaction zone can be controlled. This is achieved, for example, by incorporation of the pore forming agents in a slurry mixture comprising carbon black and PTFE suspension. Typical porosity rendered in this fashion differs from anode and cathode electrodes, and is in the range of 10-90%. Coated carbon substrates containing the gas diffusion layers are then sintered to enable proper binding of components. This can be achieved using thermal treatment to temperatures significantly above the glass transition point for PTFE, usually in the range 100 to 350° C. for 5 to 30 minutes.

Formation of Reaction Layer Comprising Electrocatalyst and Ion Conducting Components On the surface of the above described gas diffusion layer, an additional layer comprising a carbon supported catalyst, ion conducting elements (such as phosphoric acid, polyphosphoric acid or perfluoro sulfonic acid analogs), pore forming agents, and binder (such as PTFE, using PTFE-30 dispersion, from Dupont, USA) is provided. This layer can be provided using a variety of methods including spraying, calendaring, and/or screen printing. An appropriate electrocatalyst is chosen based on anode or cathode electrodes.

For the anode, a particularly suitable electrocatalyst comprises Pt in conjunction of another transition metal such as Ru, Mo, Sn. The use of such materials is beneficial due to the formation of oxides on these non-noble transition metals at lower potentials, enabling oxidation of CO or other $C_1$ moieties which are typical poisons in the output feed of fuel reformers (steam reformation of natural gas, methanol, etc.). In some embodiments, the electrocatalyst, thus, includes Pt and second transition elements either alloyed or in the form of mixed oxides. The choice can depend, for example, on the application based on choice of fuel feed-stock. The electrocatalysts, further, can be in the form of nanostructured metal alloys or mixed oxide dispersions on carbon blacks (turbostratic carbon support materials, usually Ketjen black or similar materials).

For cathode electrocatalysts, materials that are relatively immune from anion adsorption and oxide formation are preferred. In this case, the choice of the alloying element can include, for example, first row transition elements, typically Ni, Co, Cr, Mn, Fe, V, Ti, etc. It has been shown that adequate alloying of these transition elements with Pt results in deactivation of Pt for most surface processes (lowering of surface workfunction) (Electrochim. Acta 2002, 47, 3219, Fundamental Understanding of Electrode Processes, Proc.-Electrochem. Soc, Pennington, N.J. 2003; J. Phys. Chem. B 2004, 108(30), 11011, J. Electrochem. Soc. 2005, 152, A2159). This renders the surface largely bare for molecular oxygen adsorption and subsequent reduction. In addition to appropriate selection of alloys, oxygen solubility can further be enhanced by the use of perfluorosulfonic acids, either alone or as a blend with other ion conductors. It is well known that oxygen solubility is approximately eight times higher in these fluorinated analogs as compared to phosphoric acid based components (Electrochim. Acta 48, 2003, 1845). In some embodiments, the electrocatalyst of choice can be obtained from commercial vendors such as Columbian Chemicals (Marrietta, Ga., USA), Cabot Superior Micro-powders (Albuquerque, N. Mex., USA). The typical weight ratio of the catalyst on the carbon support is generally 30-60% of metal on carbon.

The next step generally involves preparation of a slurry using a combination of electrocatalyst in a suspension containing a solubilized form of the polymer substrate (copolymer 1), ion conducting element in a blend of phosphoric acid, polyphoshoric acid, and analogs of perfluorinated sulfonic acids, together with PTFE (Dupont, USA) as a binder. Additionally, pore forming components based on a combination of carbonates and bicarbonates are added, generally in amounts of about 5-10% by weight. The ratio of the components can vary by about 10-30% within the choice of each component, enabling a total catalyst loading of about 0.3 to 0.4 mg of Pt or Pt alloy/cm$^2$. The slurry can then be applied, for example, using processes such as calendaring, screen printing, spraying, and combinations thereof.

After the catalyst is applied in the form of a reaction layer, the electrode layer is then sintered and dried. In some embodiments, the electrodes are subjected to a two step process which initially involves drying elevated temperatures followed by sintering. In an exemplary embodiment, the electrodes are dried at about 160° C. for about 30 minutes, followed by sintering at temperatures in the range of about 150-350° C. for a time period in the range of about 30 minutes to about 5 hrs.

Formation of Membrane Electrode Assembly

To prepare membrane electrode assemblies, a sandwich of anode, membrane, and cathode electrodes is placed in an appropriate arrangement using, e.g. gasket materials. A typical combination is polyimide and polytetrafluoroethylene (PTFE, Dupont, USA). This is followed by hot pressing with a hydraulic press or other similar device. For example, pressures in the range of about 0.1 to about 10 bars can be applied with platen temperatures in the range of about 150 to about 250° C. for time periods typically in the range of about 10 to about 60 minutes. The prepared membrane electrode assemblies have thicknesses in the range of about 75 to about 250 micrometers.

The present method improve the catalyst utilization at the interface of a polymer electrolyte imbibed with ion conducting components (such as phosphoric, polyphosphoric and analogs of perfluorinated sulfonic acids) so as to enable higher power densities (i.e., 400 mW/cm$^2$ at 0.5 V vs. RHE, 170-180° C., $H_2$/Air). These improved power densities are achieved with lower Pt loading (0.3 to 0.4 mg/cm$^2$ vs. the current state of the art which is in the range of 0.5 to 1.0 mg/cm$^2$), thereby providing for a better gravimetric energy density. The present methods are also better able to retain ion conducting elements (such as phosphoric, polyphosphoric, and analogs of perfluorinated sulfonic acids) within the reaction layer (i.e., the catalyst containing zone at the interface between the electrode and the membrane). As a result, the present methods and materials provide long term sustained power density as well as better tolerance to both load and thermal cycling, especially transitions to below the condensation zone. Still further, the present devices and materials provide more effective control of interfacial transport of dissolved reactants, protons, and electrons while preventing and minimizing the dissolution of ionic component i.e., phosphoric acid or its improved analog under the broad classification of perfluorinated sulfonic acids (PFSA).

The following non-limiting examples are illustrative of the invention. All documents mentioned herein are incorporated herein by reference.

EXAMPLE 1

Synthesis of Copolymer
dPPy(10)coPPy(54)coT(36)S

Bis-(4-fluorophenyl)sulfone (3.147 mmol, 0.800 g), 3,3', 5,5'-Tetramethyl-[1,1'-biphenyl]-4,4'-diol (1.133 mmol, 0.274 g), 2,5-Bis(4-hydroxy-phenyl)pyridine (1.699 mmol, 0.447 g), 2,5-di(Pyridin-3-yl)benzene-1,4-diol (0.315 mmol, 0.083 g), K$_2$CO$_3$ (3.650 mmol, 0.504 g), DMF (10.0 ml) and Toluene (6.5 ml) were added to a degassed flask equipped with a Dean-Stark trap. The mixture was degassed under Ar and stirred at 150° C. for 24 hours, and then stirred at 180° C. for 48 hours. The obtained viscous product was diluted in DMF and precipitated in a 10-fold excess mixture of MeOH, washed with H$_2$O and Hexane, and dried at 80° C. under vacuum.

The same procedure was followed to produce other copolymers, by varying the feed ratio of the three diols and/or using different aromatic difluorides.

EXAMPLE 2

Casting and Doping Procedure of Copolymer dPPy(10)coPPy(54)coT(36)S 1.0 g of copolymer 1 was dissolved in 15 ml dimethylacetamide at room temperature. The solution was filtrated through glass wool and poured in glass dish of 95 mm diameter. The solvent was slowly evaporated at 70° C. for 24 h and the membrane dried at 160° C. for 72 h under vacuum. The membrane was immersed in 85 wt % phosphoric acid at 100° C. for 8 h in order to reach a doping level 370 wt %.

EXAMPLE 3

Membrane Electrode Assembly

Carbon paper (Toray TGP H-120) was initially wet proofed by dipping in a PTFE-30 dispersion (Dupont, USA). For this, a typical loading of 0.6-1.5 mg/cm$^2$ was used. The gas diffusion layer was applied using a slurry comprising Ketjen black (Engelhard, USA) with a surface area of 250 m$^2$/gm, TFE –30 dispersion (Dupont, USA), and ammonium carbonate in a ratio of 60:30:10% respectively. After adequate stirring, this slurry was calendared (Gravure coaters from Euclid coating systems (Bay City, Mich., USA) on to the wet proofed carbon paper using a calendaring machine to a thickness of about 50-100 micrometers. After the gas diffusion layer was obtained, it was next sintered in air using a muffle furnace with adequate venting at a temperature in the range of 100-200° C. for 10 to 15 hours.

The reaction layer was next deposited using a choice of individual anode and cathode electrocatalysts. For this, a separate slurry was prepared containing the electrocatalyst, binder (PTFE-30, dispersion from Dupont, USA), ammonium bicarbonate, and a blend of solubilized form of the polymer electrolytes (copolymer 1) and both volatile and non volatile acid (i.e., poly fluorinated sulfonic acid, PFSA in a combination with phosphoric acid) in a ratio ranging between 1:1 to 1:5. This slurry was calendared onto the gas diffusion side of the electrode to make the individual anode and cathode electrodes using the same procedure described above with the aid of a coating machine (Gravure coaters from Euclid coating systems, Bay City, Mich., USA). Additionally, the reaction layer in the cathode electrode also contained 5% by weight ammonium carbonate to afford pore formation.

Acid doped blended polymer membranes with a combination of the structure of Formula I was next used to prepare the membrane electrode assembly. For this, a die set-up was used with Teflon (Dupont, USA) and polyimide gaskets to achieve the appropriate compression and sealing in the single cell. Hot pressing conditions were 150-250° C. and 10 bar for 25 minutes.

The membrane electrode assembly so prepared was tested in a 5 cm$^2$ single cell (Fuel Cell technologies, Albuquerque, N. Mex., USA) with the aid of a potentiostat (Autolab PGSTAT-30) in conjunction with a current booster (10 A). Polarization measurements were conducted at 150-200° C., 1.5 bars, H$_2$/Air (2:2 stoichiometric flow).

The invention has been described in detail with reference to particular embodiments thereof. However, it will be appreciated that those skilled in the art, upon consideration of this disclosure, may make modification and improvements within the spirit and scope of the invention.

What is claimed is:
1. An aromatic polyether copolymer having the formula:

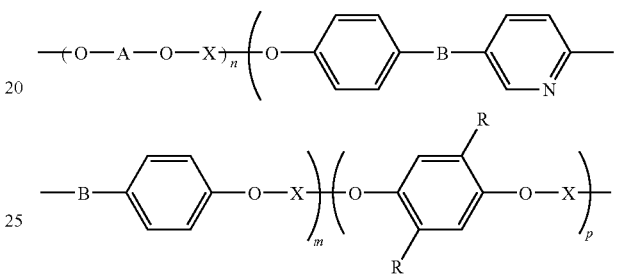

wherein A is selected from the group consisting of:

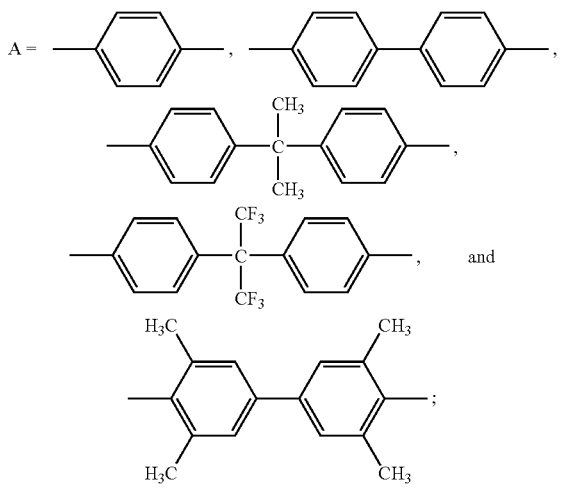

B is selected from the group consisting of:

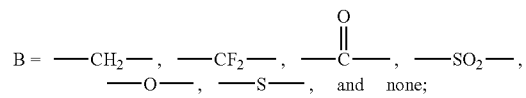

R is selected from the group consisting of:

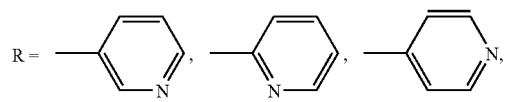

-continued

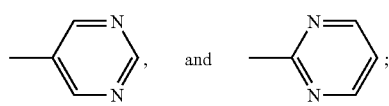

X is identical or different and is selected from the group consisting of:

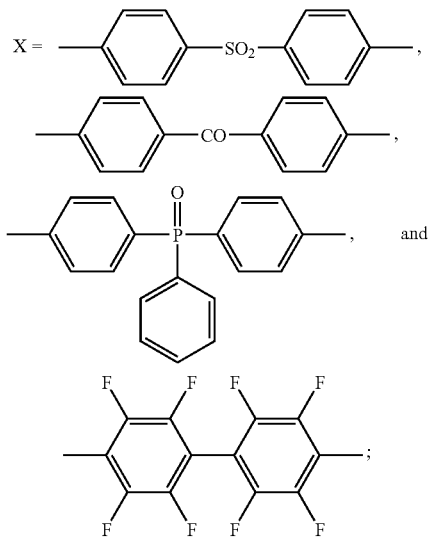

or a salt thereof; and n ranges from about 1% to about 98%, m ranges from about 1% to about 98%, and p ranges from about 1% to about 98%, and wherein n+m+p=100%.

2. The copolymer of claim 1, wherein the copolymer is a block, random, periodic and/or alternating polymer.

3. The copolymer of claim 1, wherein A is

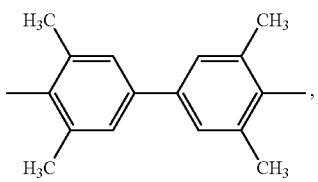

B is none, R is

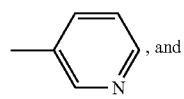

and X is identical and is

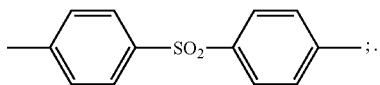

4. The copolymer of claim 1 comprising the reaction product of an aromatic difluoride with main chain pyridine and side chain pyridine or pyrimidine units.

5. The copolymer of claim 4 wherein the aromatic difluoride is bis-(4-fluorophenyl)sulfone, bis-(4-fluorophenyl)phenylphosphine oxide, 4,4'-difluorobenzophenone, or decafluorobipheynyl.

6. A process for preparing the copolymer of claim 1 comprising polycondensing monomers at high temperature.

7. A process for preparing the copolymer of claim 1 comprising reacting an aromatic difluoride with main chain pyridine and side chain pyridine or pyrimidine units.

8. The process of claim 7, wherein the aromatic difluoride is bis-(4-fluorophenyl)sulfone, bis-(4-fluorophenyl)phenylphosphine oxide, 4,4'-difluorobenzophenone, or decafluorobipheynyl.

9. A compolymer blend comprising two or more different copolymers in accordance with claim 1 mixed with dimethylacetamide solutions at predetermined ratios.

10. The copolymer blend of claim 9, comprising two different copolymers mixed at a predetermined ratio of about 50/50.

11. A composition comprising a slurry mixture of one or more copolymer of claim 1 and a polar aprotic solvent.

12. A composition comprising a slurry mixture of the blend of claim 9 and a polar aprotic solvent.

13. The copolymer of claim 1, further doped with one or more acids.

14. The blend of claim 9, further doped with one or more acids.

15. The copolymer or blend of claim 13 or 14 wherein the one or more acids are selected from sulfuric acid, phosphoric acid, hydrochloric acid, nitric acid, heteropolyacids, antimonic acid, phosphoantimonic acid, and combinations thereof.

16. The copolymer of claim 1, further being mixed with organic base heterocycles selected from imidazol, pyrazole, methyl-imidazole, and imidazole derivatives.

17. The blend of claim 9, further being mixed with organic base heterocycles selected from imidazol, pyrazole, methyl-imidazole, and imidazole derivatives.

18. A method of preparing a catalyst comprising:
(a) providing a hydrophobic layer;
(b) depositing a layer of the composition of claim 11 by calendaring, screen printing or spraying on the hydrophobic layer; and
(c) drying and sintering the deposited layer.

19. A layered membrane electrode assembly comprising:
(a) a substrate layer;
(b) a gas diffusion layer; and
(c) a reaction layer comprising one or more copolymers of claim 1 doped with one or more acid.

* * * * *